(12) United States Patent
Weissbrod

(10) Patent No.: US 8,307,981 B1
(45) Date of Patent: Nov. 13, 2012

(54) ELECTRODE CONTAINER HAVING AN INSERT FOR ELECTRODE REMOVAL

(75) Inventor: Paul A. Weissbrod, South Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/167,177

(22) Filed: Jun. 23, 2011

(51) Int. Cl.
*B65D 85/20* (2006.01)
(52) U.S. Cl. .............................. 206/443; 206/804; 220/8
(58) Field of Classification Search ................. 206/443, 206/446, 526, 804; 229/4.5; 220/8
See application file for complete search history.

(56) References Cited

U.S. PATENT DOCUMENTS

| | | | | |
|---|---|---|---|---|
| 1,080,933 A * | 12/1913 | Sellman | ......................... | 206/804 |
| 1,342,243 A * | 6/1920 | Wilson | .......................... | 206/804 |
| 2,390,631 A * | 12/1945 | Young | ........................... | 206/443 |
| 2,624,646 A * | 1/1953 | Sukoff | ........................... | 312/311 |
| 3,362,530 A * | 1/1968 | Johnson | ........................ | 206/804 |
| 4,363,402 A | 12/1982 | Grzyll | | |
| 4,497,407 A * | 2/1985 | Stager | ........................... | 206/443 |
| 4,589,550 A | 5/1986 | Stager | | |
| 5,464,141 A * | 11/1995 | Brindle | ......................... | 206/443 |
| 7,854,323 B2 | 12/2010 | Weissbrod | | |
| 7,942,266 B2 * | 5/2011 | Weissbrod | .................... | 206/443 |
| 7,975,847 B2 * | 7/2011 | Weissbrod | .................... | 206/443 |
| 2008/0110881 A1 * | 5/2008 | Schulz et al. | ................. | 206/804 |
| 2010/0308096 A1 | 12/2010 | Carlozzi et al. | | |

FOREIGN PATENT DOCUMENTS

FR 2935363 A1 3/2010
GB 825962 A 12/1959

OTHER PUBLICATIONS

Thermadyne Firepower Tungsten Electrodes, Mar. 22, 2011, 2 pages, http://www.northerntool.com/shop/tools/product_200361186_200361186?ci_src=15781033&ci_sku=164012&cm_ven=Performics&cm_cat=Performics&cm_pla=Performics&cm_ite=Performics.

* cited by examiner

*Primary Examiner* — Bryon Gehman
(74) *Attorney, Agent, or Firm* — Hahn Loeser & Parks LLP

(57) ABSTRACT

An insertable electrode insert and electrode container for a plurality of welding electrodes is described. The insert is positioned within the electrode container and is removed with the assistance of an apertured handle.

5 Claims, 11 Drawing Sheets

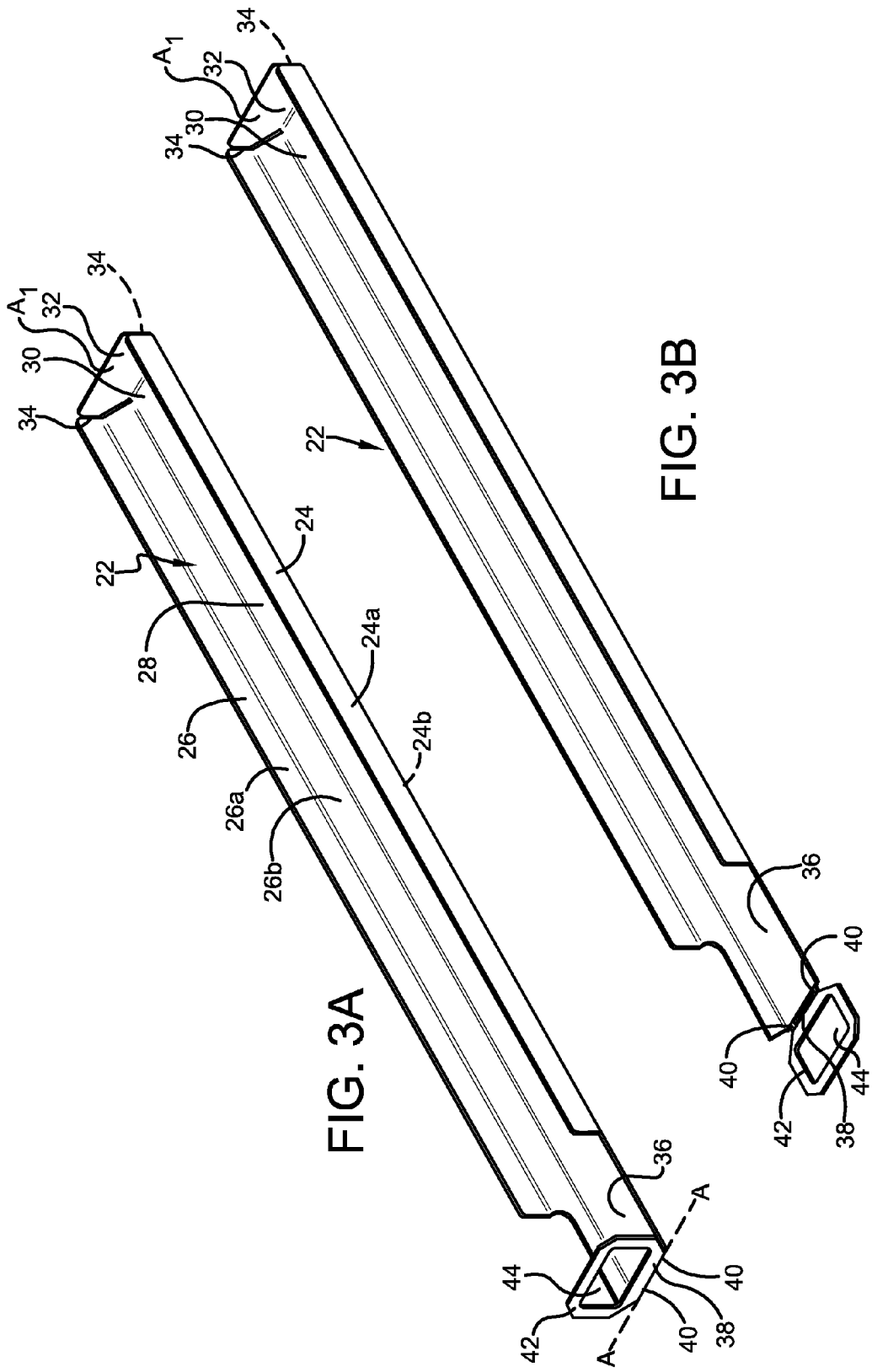

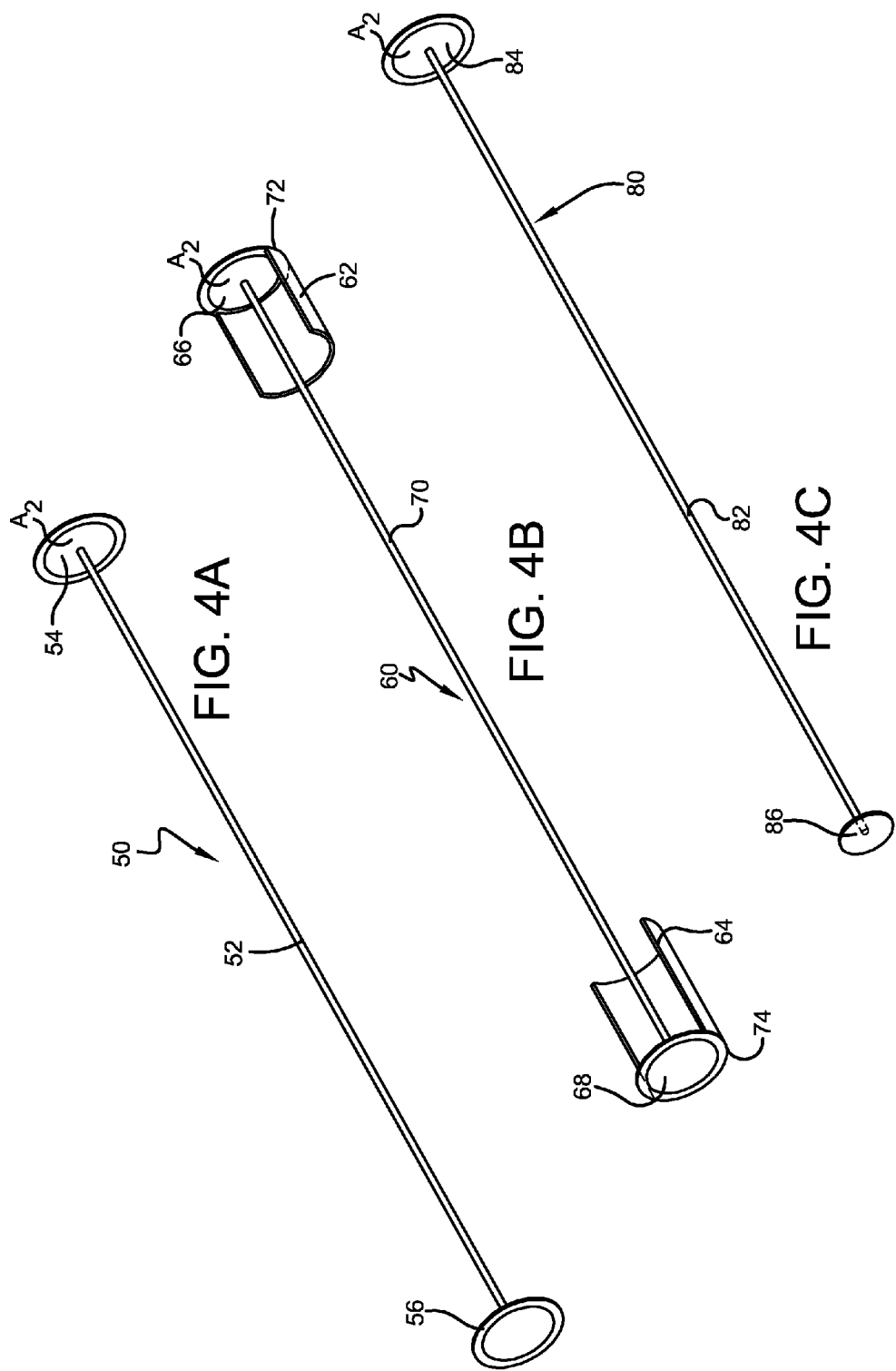

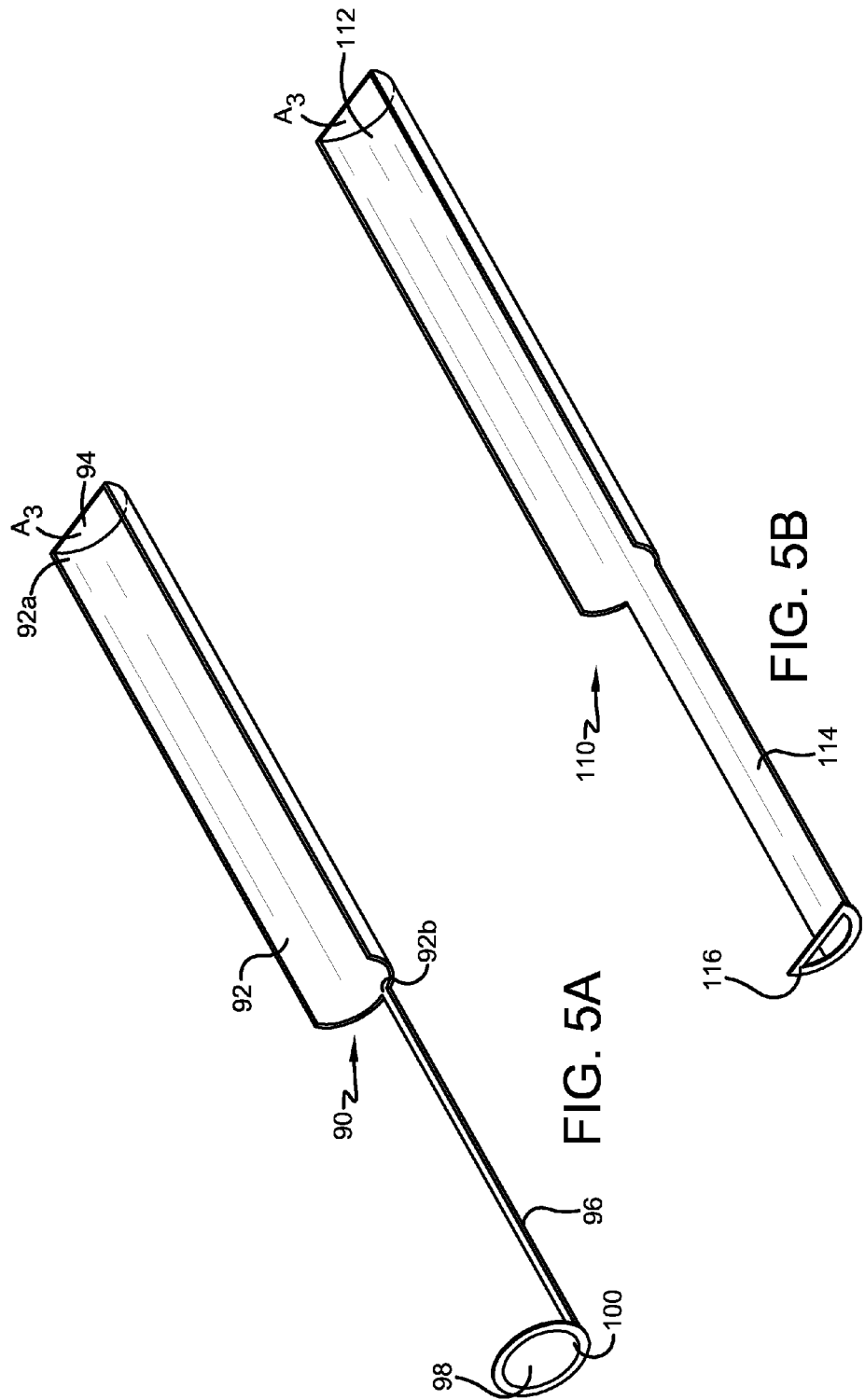

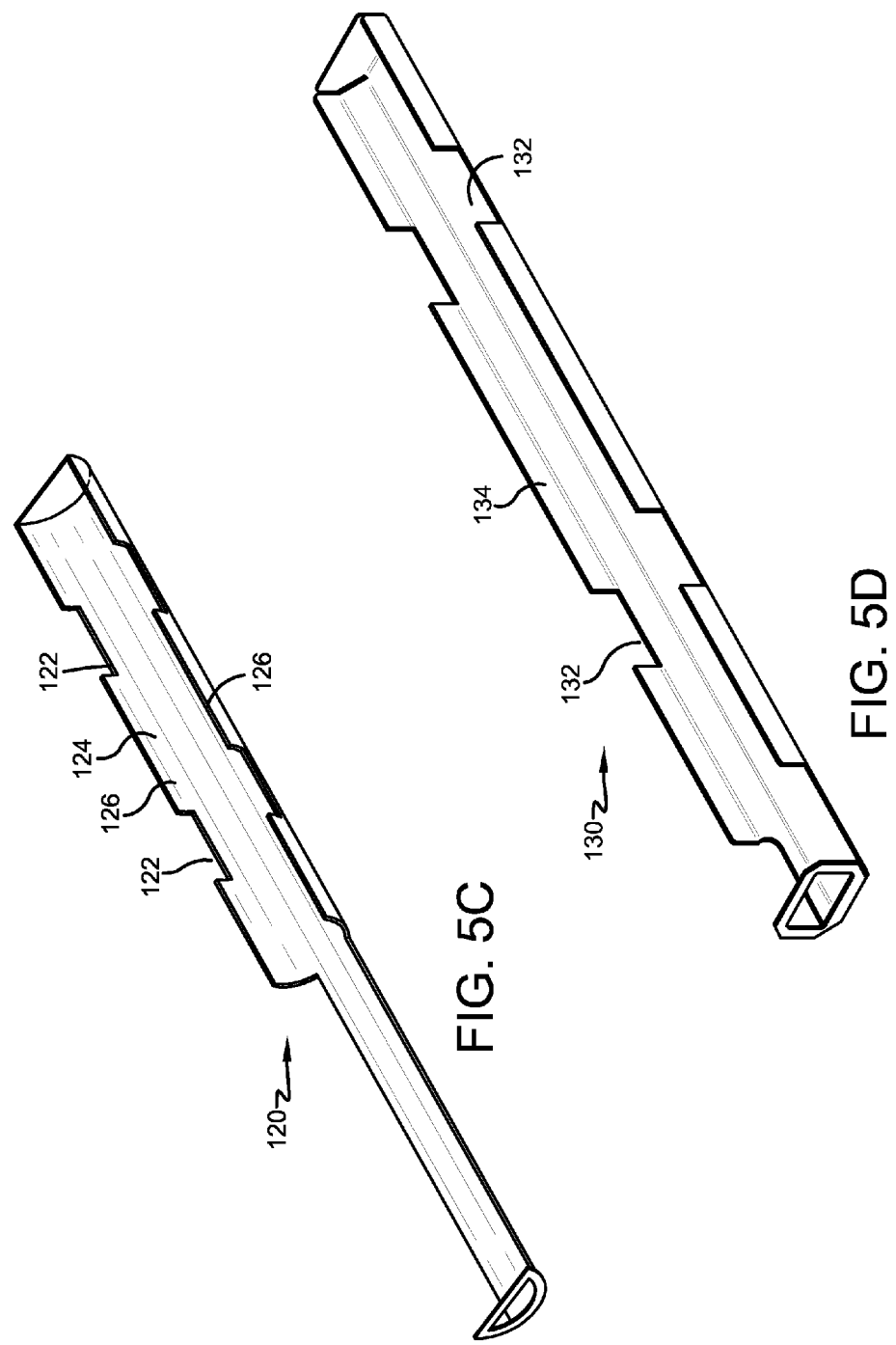

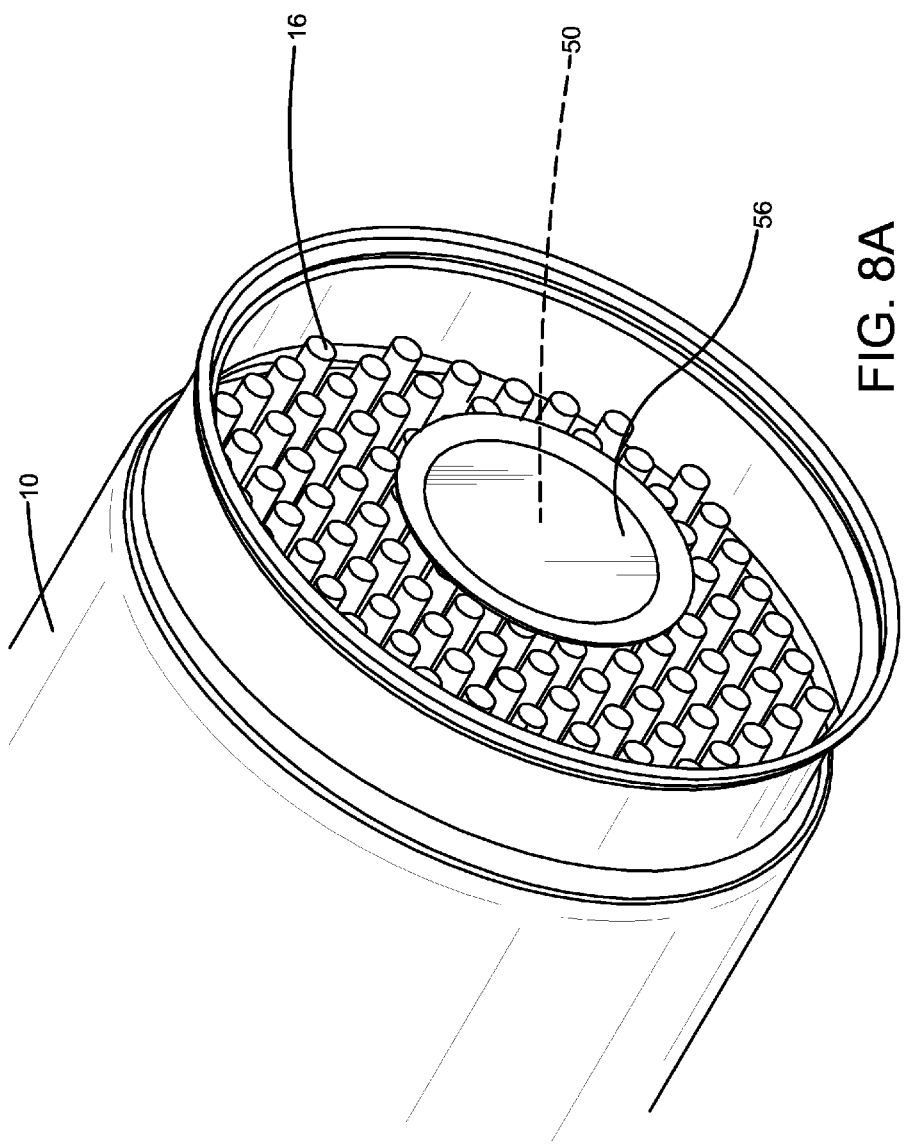

ELECTRODE CONTAINER HAVING AN INSERT FOR ELECTRODE REMOVAL

TECHNICAL FIELD

The invention described herein relates generally to electrode containers having an insert that facilitates electrode removal.

BACKGROUND OF THE DISCLOSURE

Countless products are packaged and shipped to end-users in this country and around the globe every day. Many products are placed in crates or boxes and filled with packing material to minimize or prevent damage during shipping. In some circumstances, products are wrapped with layers of plastic material encapsulated with air, known commonly as bubble wrap, which helps protect the product from shock or impact. Other containers are filled with packing materials made from polymers expanded into foam through the use of heat, typically in the form of steam. Polystyrene is an example of one such type of polymer. These air filled "peanuts" also function to protect the packaged products by absorbing force thereby minimizing damage to the surrounding article.

Some products are stored and packaged in canisters, which may be sealed to prevent the enclosed items from exposure to ambient conditions. Some canisters are hermetically sealed to prevent exposure to air and/or humidity, which may oxidize or otherwise damage the contents. Such containers help preserve the freshness of the packaged items. Examples of packaged products range from edible substances to industrial consumables. In many cases, the same or similarly sized canisters are used to package different quantities of materials. For a particular quantity of product, extra space remaining in the canister may allow the product to jostle about during shipment providing opportunity for individual articles to collide with each other and the walls of the canister thereby increasing the likelihood of damage.

One particular example of packaged articles relates to welding consumables, and more specifically welding electrodes. Stick welding is a common welding process. The process utilizes a finite length welding rod that is consumed by establishing an arc between the electrode and the work piece. The electrodes function best when stored in air tight containers. Containers are filled with electrodes to capacity because extra space within the container often causes damage to the welding rods as applied coatings are prone to fracture when the welding rods collide and/or impinge with each other during shipment. Containers filled to capacity with electrodes are tightly packed and makes removal of electrodes by hand very difficult, sometimes impossible. Often, a user will try to use a tool, e.g., a needle-nose pliers, to remove or withdraw an electrode from the container or try to shake the can upside-down. However, even this mechanical assist method negatively impacts applied coating(s).

It would be useful to incorporate an insert or tray that makes removal of an electrodes by hand easier when the container is filled to capacity. What is needed is an insert or tray that facilitates electrode removal from a container that is filled to capacity. The embodiments of the subject invention obviate aforementioned problems.

SUMMARY OF THE DISCLOSURE

In accordance with the present invention, there is provided, in combination, an insert and a container that includes a plurality of welding electrodes packed in the container having an opening with a first cross sectional area, a longitudinally axially repositionable tray, and a means for removing the tray and the at least one of the plurality of welding electrodes from packed the container. The tray having a bottom and a second cross sectional area that is equal to or less than the first cross sectional area of the container where the tray is positioned within the container and holds at least one of the plurality of welding electrodes. Further, the means for removing the tray and the at least one of the plurality of welding electrodes from the packed container is positioned on an opposed end of the bottom of the tray and the cross sectional areas are normal to a longitudinal axis of the tray.

Also within the scope of the invention is, in combination, a longitudinally extending insert and a container that includes a plurality of welding electrodes packed in the container having an opening with a first cross sectional area, a longitudinally axially repositionable rod and an end flange, and a means for removing the rod and the at least one of the plurality of welding electrodes from the packed container. The rod and the end flange are packed in the container and hold at least one of the plurality of welding electrodes, and wherein the rod and the end flange have a second cross sectional area that is equal to or less than the first cross sectional area of the container. In addition, the means for removing the rod and the at least one of the plurality of welding electrodes from the packed container is positioned on at least one opposed end of the rod and the cross sectional areas are normal to a longitudinal axis of the rod.

Also within the scope of the invention is another apparatus that includes a first container having a first cross sectional area, a plurality of welding electrodes packed in the first container, a longitudinally extending second container holding at least one welding electrode, and a means for removing the second container and the at least one welding electrode from the first container. The second container is packed in the first container, and wherein the second container has a second cross sectional area that is equal to or less than the first cross sectional area of the container. Further, the means for removing the second container and the at least one welding electrode from the first container is positioned on an end of the second container and the cross sectional areas are normal to a longitudinal axis of the container.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIGS. 3*a*-3*b* are top perspective views of a tray according to an embodiment of the invention;

FIGS. 4*a*-4*c* are top perspective views of various inserts according to an embodiment of the invention;

FIGS. 5*a*-5*d* are top perspective views of alternative trays according to an embodiment of the invention;

FIG. 8a is a top perspective view of an open container having an insert and electrodes packed in said container according to an embodiment of the invention.

DETAILED DESCRIPTION OF THE DRAWINGS

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
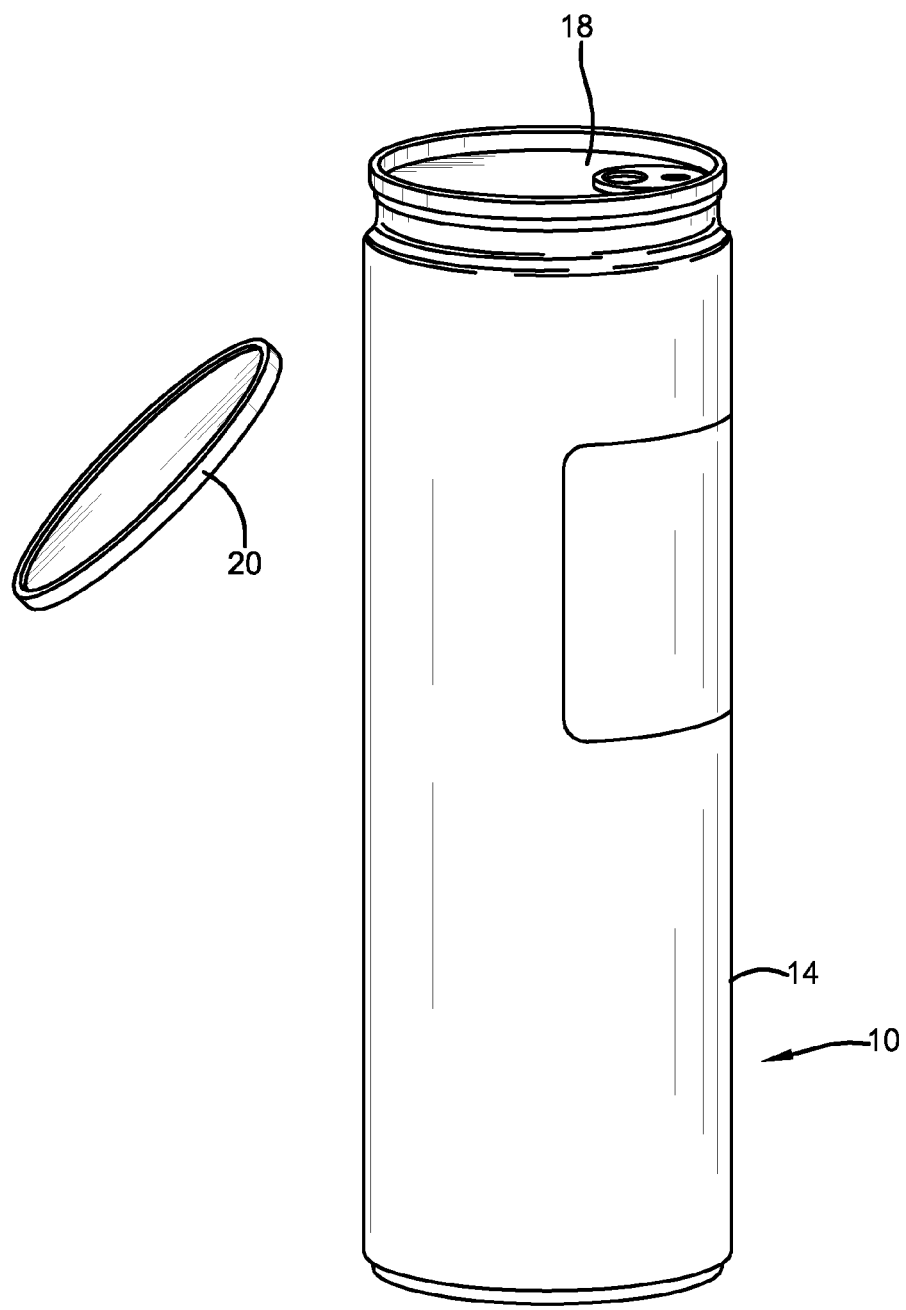
FIG. 1 is a perspective view of a prior art container for storing and/or transporting articles.

Referring now to the drawings wherein the showings are for purposes of illustrating embodiments of the invention only and not for purposes of limiting the same, FIG. 1 shows a prior art container for holding various articles, depicted generally as container 10. Container 10 may be used to package a plurality of tightly packed articles 12, shown in FIG. 2, for storage and/or transportation purposes. As such, the walls of container 10 may be generally rigid or semi-rigid. In one embodiment, container 10 may be a cylindrical receptacle constructed from metal or metal alloy. In another embodiment, the container may be a boxlike container or have another shape. However, persons of ordinary skill in the art will readily understand the application of the embodiments of the subject invention to any size, shape and/or material used to construct container 10. By way of example, the figures depict a generally cylindrical canister 14. Canister 14 may be used to hold rod-like articles, such as for example, welding electrodes or rods 16. However, the type of articles 12 contained by canister 14 are not to be construed as being limited to welding materials or even rod shaped articles. Rather any type of article 12 may be stored in canister 14 as is appropriate for use with the embodiments of the subject invention. In the illustrated embodiment, canister 14 may be hermetically sealed with pop-open tabbed cap or seal 18. Sealing canister 14 in this manner helps to preserve articles 16 stored within the canister 14 from exposure to ambient conditions. Reclosable cap 20 (see FIG. 1) may also be provided for subsequently sealing the contents of canister 14 after seal 18 (see FIG. 2) has been removed.

Figure 2:
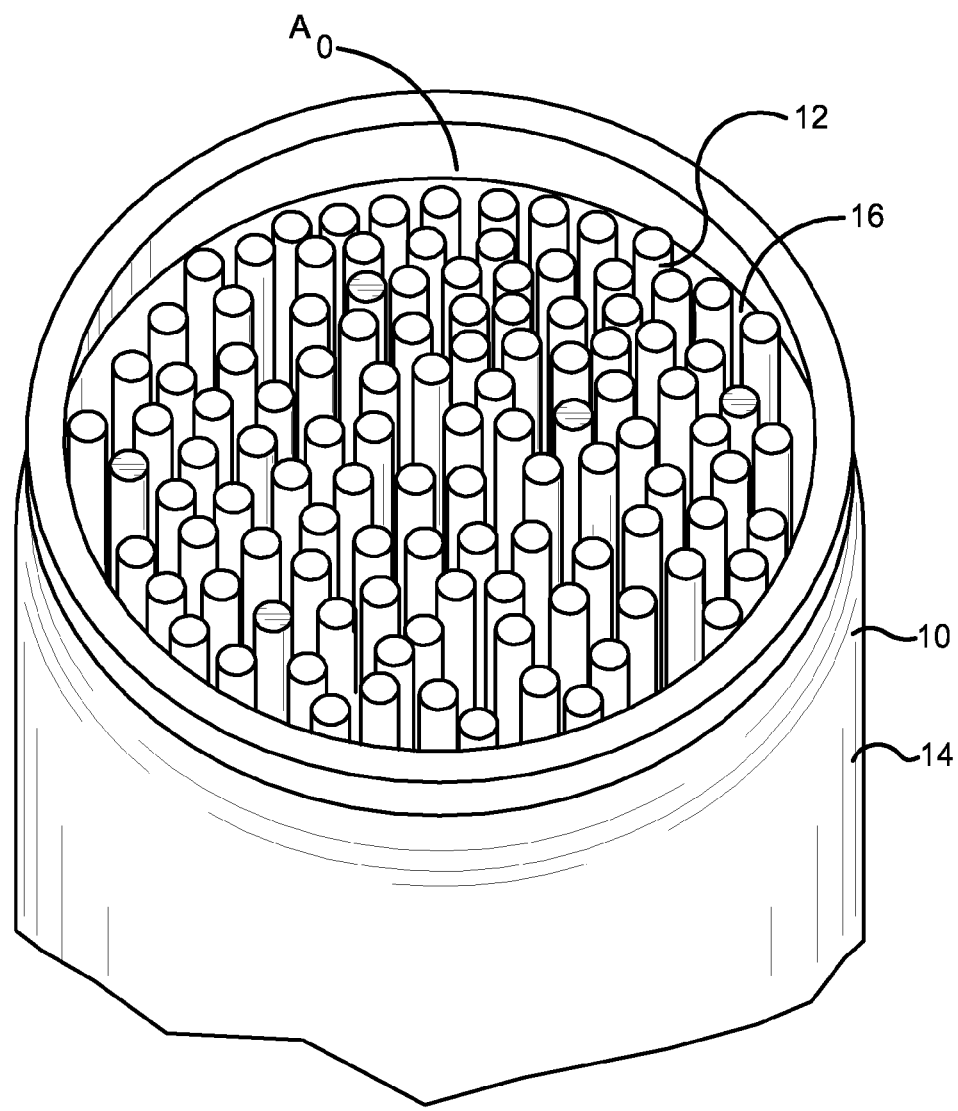
FIG. 2 is a close up perspective view of a prior art open container tightly packed articles.

FIG. 2 illustrates a plurality of tightly packed rod-like articles 12 stored within container 10 in the prior art. In certain applications, container 10 may be utilized to store a particular amount of material, which may be measured in terms of weight. For example, ten (10) pounds of a particular type of welding rod 16 may be designated for storage in container 10. It will be readily understood that one type of welding rod 16 may have a substantially different density than another type of welding rod. Accordingly, ten (10) pounds of a first type of welding rod 16 will result in a different quantity than a second type of welding rod. In either case, the same kind of container 10 may be used to store both types of welding rod 16, and container 10 may be tightly packed. A container is tightly packed when one additional welding rod will not physically fit inside the container. Removal of an individual welding rod by hand may be difficult because welding rods 16 are tightly packed in container 10 and a user may not be able to overcome the forces produced by adjacent tightly packed welding rods, e.g., frictional forces, as a user tries to remove a welding rod. Without the use of an apparatus (discussed below), removal of welding rod 16 from tightly packed container 10 having an opening with cross sectional area $A_o$ may be difficult to remove by hand, so a person might resort to using a hand tool to remove welding rod 16 from the tightly packed container 10. Accordingly, insert 22, discussed below and shown in FIG. 3a, for example, may be packaged with welding rods 16 to facilitate removal of welding rods by hand from a tightly packed container 10.

FIGS. 3a-3b illustrate top perspective views of insert 22 that can be packaged with welding rods (not shown) in a container (discussed above) to facilitate welding rod removal. Insert 22 may be configured to have a length, width, and cross sectional area $A_1$ so that insert 22 fits inside container 10. In other words, the insert has a length, width, and maximum cross sectional area that are less than a length, width, and cross sectional area of the corresponding dimensions and areas of the container, for example the cross sectional area of the opening of the container. In the illustrated embodiment, insert 22 has maximum cross sectional area $A_1$ that is normal to a longitudinal axis of the insert where maximum cross sectional area $A_1$ is equal to the area of the end flange (discussed below). Further, maximum cross sectional area $A_1$ is equal to or less than container cross sectional area $A_0$ (discussed above) so the insert can be longitudinally axially positioned inside the container. As such, persons of ordinary skill in the art will readily understand the application of the embodiments of the subject invention to any size, shape and/or material used to construct insert 22. In the illustrated embodiment, insert 22 is a tray-shaped insert that includes longitudinally extending first sidewall 24 and second sidewall 26 and bottom 28 that extends laterally between sidewalls 24 and 26. Bottom 28 extends upward at first end 30 to form end flange 32. First sidewall 24 and second sidewall 26 each have upper portions 24a, 26a that are essentially parallel with each other and lower portions 24b, 26b that bend inwards toward the center of insert 22 connecting to bottom 28 to form a half octagon perimeter. In another embodiment, first and second sidewalls are parallel with each other and connect to the bottom to form an insert having a half square or rectangular perimeter. In yet another embodiment, the insert may have a partial circular or partially oval perimeter. In another embodiment, the insert has at least one longitudinally extending surface that has a perimeter different from the previously discussed perimeters, for example a partial triangular perimeter.

In the illustrated embodiment, end flange 32 laterally extends between but does not contact ends of first sidewall 24 and second sidewall 26 to form two vertical extending slots 34. In another embodiment, end flange may be welded to the sidewalls, essentially eliminating the space formed by vertically extending slots. In the illustrated embodiment, end flange 32 is configured so it can contain and remove welding electrodes or another material from a tightly packed container. In another embodiment, the end flange extends between and securely connects to ends of the first and second sidewalls. In yet another embodiment, the end flange is reinforced with a rib that securely connects both sidewalls to the end flange.

In the illustrated embodiment, bottom 28 of insert 22 extends from second end 32 to form neck portion 36. Neck portion 36 does not include sidewalls to facilitate removal of electrodes from insert 22 after it has been at least partially removed from the container, further discussed below. In another embodiment, the neck portion includes at least portions of the sidewalls that longitudinally extend to a location adjacent to the handle. In the illustrated embodiment, neck portion 36 longitudinally extends to centrally located, laterally extending slot 38. Two longitudinally extending hinges 40 extend from neck portion 36 on both ends of slot 38 and attach neck portion 36 to handle 42 having at least one aperture 44 interposed between hinges 40. In the illustrated embodiment, insert 22 is configured to hold electrodes between first sidewall 24 and second sidewall 26 and between end flange 32 and handle 42. In another embodiment, the insert may include more than one slot, a single or more than two longitudinally extending hinges, more than one laterally extending slot, or may include at least one slot that is not centrally located. In yet another embodiment, insert may include a hinge apparatus that securely attaches to both the neck portion and the handle. In another embodiment, handle has an alternative shape and/or handle has more than one aperture. In yet another embodiment, the handle is securely attached to the neck portion or the bottom of the insert by a fastener. In another embodiment, the insert does not include a slot.

In the illustrated embodiment, laterally extending slot 38 and each longitudinally extending hinge 40 are configured so that neck portion 36 is hingedly engaged with handle 42. For example, handle 42 can move at least about axis A-A between +/− approximately 90 degrees relative to neck portion 36 as handle 42 moves from an extended position and a stored position, wherein axis A-A is parallel with slot 38. Hinges 40 may be made from a material having a thickness that facilitates movement of handle 42 at least one time between the stored position and the extended position. For example, handle 42 extends from each hinge 40 at about a 90 degree angle relative to neck portion 36 (as illustrated in FIG. 3a) when handle 42 is in the stored position. Alternatively, handle 42 extends from each hinge 40 at about a zero degree angle (as illustrated in FIG. 3b) in an extended position to facilitate removing insert 22 from container 10 or moving insert 22 back into the stored position. Once handle 42 is moved to about the extended position, a person may use at least one finger in aperture 44 of handle 42 or may grasp by hand handle 42 to pull the insert out and to push the insert back into container 10 without using a hand tool. Alternatively, handle 42 can be in the stored position to push the insert back into container 10. If insert 22 is not completely withdrawn from container 10, insert 22 can be pushed back into container 10 and refilled with welding electrodes.

In the illustrated embodiment, insert 22 can be made by machining, molding, forming, or other processes known by one skilled in the art. In the illustrated embodiment, insert 22 is preferably made from materials designed to hold the welding electrodes and to withstand forces transmitted to the insert from adjacent welding electrodes or materials as insert 22 moves in and/or out of container 10. Insert 22 may optionally be made from at least one of the following materials: metal, plastic, and reinforced paper-based materials. A non-exhaustive, exemplary list of metals includes carbon steel, stainless steel, aluminum, and copper, while a similar non-limiting exemplary list of reinforced paper materials includes corrugated fiberboard, cardboard, and the like. A non-limiting exemplary listing of plastic materials useful in the manufacture of the insert includes thermoset resins, thermoplastic resins, and reinforced resins of either type. For example, inserts made from thermoplastics may be made from a non-exhaustive and non-limiting list that includes poly(meth) acrylics, celluloids, poly(ethylene-vinyl acetate), flouroplastics, poly(meth)acrylates, polyamides, polycaprolactone, polycarbonate, polyethylene, polypropylene, polybutylene, and polyvinyl chloride. A non-exhaustive and exemplary list of thermosets includes vulcanized rubbers, melamine resins, polyimides, and fiberglass-filled polyesters as well as crosslinked thermoplastics.

FIG. 4a illustrates an alternative insert 50 that may be packaged inside a container to facilitate removal of welding rods by hand from a tightly packed container. In the illustrated embodiment, insert 50 includes longitudinally extending connector 52 that is securely connected on a first end to disk and circular shaped end flange 54 and securely connected on a second end to disk shaped handle 56. Disk and circular shaped end flange 54 has a maximum cross sectional area $A_2$ (as illustrated in FIGS. 4a-c) that is normal to a longitudinal axis of the insert where maximum cross sectional area $A_2$ is equal to the area of the disk and circular shaped end flange 54. Maximum cross sectional area $A_2$ is equal to or less than container cross sectional area $A_0$ (discussed above) so the insert can be longitudinally axially positioned inside the container. In the illustrated embodiment, longitudinally extending connector 52 is a rigid rod that is configured to provide strength when insert 50 is tightly packed with electrodes. In addition, longitudinally extending connector 52 provides strength when insert 50 is pulled or pushed in container 10.

In the illustrated embodiment, longitudinally extending connector 52, disk and circular shaped end flange 54, and disk shaped handle 56 are made from metals identified previously. In another embodiment (not shown), longitudinally extending connector, disk shaped end, and/or disk shaped handle may be made from plastic or reinforced paper materials, including the non-exhaustive and non-limiting list of plastic and reinforced paper materials discussed above.

In the illustrated embodiment, laterally extending connector 52 is soldered or welded to disk and circular shaped end flange 54 and disk shaped handle 56. In another embodiment, longitudinally extending connector is securely fastened to disk shaped end flange and disk shaped handle by fasteners, e.g. the laterally extending connector has internally threaded apertures at both ends and the disk shaped end flange and handle each have a centrally located aperture that align with the internally threaded apertures to receive a threaded fastener. In yet another embodiment, the handle and/or the end flange can have another shape and/or can include an aperture.

FIG. 4b illustrates another alternative insert 60 that is substantially similar to insert 50, discussed above, except insert 60 includes longitudinally extending, half circle shaped or concave upper support retainer 62 and lower support retainer 64 that securely attach at least to disk and circular shaped end flange 66 and optionally to disk shaped handle 68. Laterally extending connector 70 securely attaches to disk and circular shaped end flange 66 and disk shaped handle 68. In the illustrated embodiment, upper support retainer 62 longitudinally extends inward, longitudinally away from disk and circular shaped end flange 66. Upper support retainer 62 forms an arc that extends around about 180 degrees of lower perimeter 72 of disk shaped end 66. Similarly, lower support retainer 64 longitudinally extends inward, longitudinally away from disk shaped handle 68. Lower support retainer 64 forms an arc that extends around about 180 degrees (recognizing that larger and smaller arcs are within the scope of the invention) of lower perimeter 74 of disk shaped handle 68. Concave support retainers 62 and 64 are configured to have a length that guides the welding electrodes in and out of the container. In another embodiment, concave supports can extend from more or less of the perimeter than what is illustrated in FIG. 4b or the end flange, handle, and supports can have another shape. In yet another embodiment, a concave support runs longitudinally from the end flange to the handle.

FIG. 4c illustrates alternative insert 80 having a flexible, longitudinally extending connector 82 that may be a flexible rod, cable, or wire. Flexible connector 82 is securely attached on a first end to disk shaped end flange 84 and on a second end to handle 86 that is configured for pulling insert 80 from the container. In the illustrated embodiment, insert 80 is configured for initial removal of tightly packed welding electrodes from a container that is newly opened. In other words, the insert may be discarded after the first removal of the insert from the container because the container is likely no longer tightly packed and subsequent welding electrodes may be relatively easy to remove by hand. In the illustrated embodiment, handle 86 is a circular ring that can be grasped by hand. In another embodiment, handle 86 has another shape than what is illustrated in FIG. 4c. In the illustrated embodiment, insert 80, including flexible connector 82, disk shaped end flange 84, and handle 86 are made from metals identified previously. In another embodiment (not shown), insert, including flexible connector, disk shaped end flange, and/or handle may be made from plastic or reinforced paper materials, including the non-exhaustive and non-limiting list of plastic and reinforced paper materials discussed above.

FIG. 5a illustrates an alternative insert 90. In the illustrated embodiment, insert 90 has a longitudinally extending tray 92 that has a partial circular shaped, lower lateral perimeter that extends to and securely attaches to end flange 94 on first end 92a. End flange 94 has a half circle shape having maximum cross sectional area $A_3$ (as illustrated in FIGS. 5a-b) that is normal to a longitudinal axis of the insert where maximum cross sectional area $A_3$ is equal to the area of the half circle shaped end flange 94. Further, maximum cross sectional area $A_3$ is equal to or less than container cross sectional area $A_0$ (discussed above) so the insert can be longitudinally axially positioned inside the container. On a lower portion of second end 92b, longitudinally extending tray 92 is securely attached to a longitudinally extending connector 96. Longitudinally extending connector 96 extends and connects to a lower portion of circular handle 98 having optional aperture 100. In the illustrated embodiment, longitudinally extending tray 92 and longitudinally extending connector 96 each extend about 50% the length of insert 90 (although both longer and shorter lengths are within the scope of the invention). In another embodiment, longitudinally extending tray and longitudinally extending connector extend more or less than what is illustrated in FIG. 5a. In the illustrated embodiment, longitudinally extending connector 96 is rigid and insert 90 can be removed from and inserted into a welding rod container and refilled with material, e.g., electrodes, more than once as long as insert 90 is not withdrawn completely from the container. In another embodiment, longitudinally extending connector is flexible and the insert may only be used once to remove the first rods from the tightly packed container. In yet another embodiment, longitudinally extending tray has another shape or lower lateral perimeter than what is illustrated in FIG. 5a, for example a partial inverted triangle, a partial square, and a partial rectangle.

In the illustrated embodiment, insert 90, including longitudinally extending tray 92, end flange 94, connector 96, and/or handle 98 are made from metals identified previously. In another embodiment (not shown), longitudinally extending tray, end flange, connector, and/or handle may be made from plastic or reinforced paper materials, including the non-exhaustive and non-limiting list of plastic and reinforced paper materials discussed above.

FIG. 5b illustrates an alternative insert 110 that is similar to insert 90 discussed above, except insert 110 has a partial U-shaped perimeter neck 114 that extends and connects to a D-shaped handle 116. As discussed above, handle 116 is configured to move between a stored position and an extended position. For example, handle 116 may be hingedly connected to neck 114 by at least one longitudinally extending hinge and/or at least one lateral slot.

FIG. 5c illustrates insert 120 that is similar to insert 110, discussed above, except insert 120 includes at least one notch 122 in longitudinally extending tray 124 that facilitates removal of at least one welding electrode from insert 120. In the illustrated embodiment, notch 122 forms a rectangular opening in sidewalls 126 of longitudinally extending tray 124. In another embodiment, the at least one notch may have a square or partial circular or partial oval shape. Similarly, FIG. 5d illustrates an alternative insert 130 that is similar to insert 22, discussed above, except insert 130 includes at least one rectangular notch 132 in longitudinally extending tray 134 that facilitates removal of at least one welding electrode from insert 130.

Figure 6:
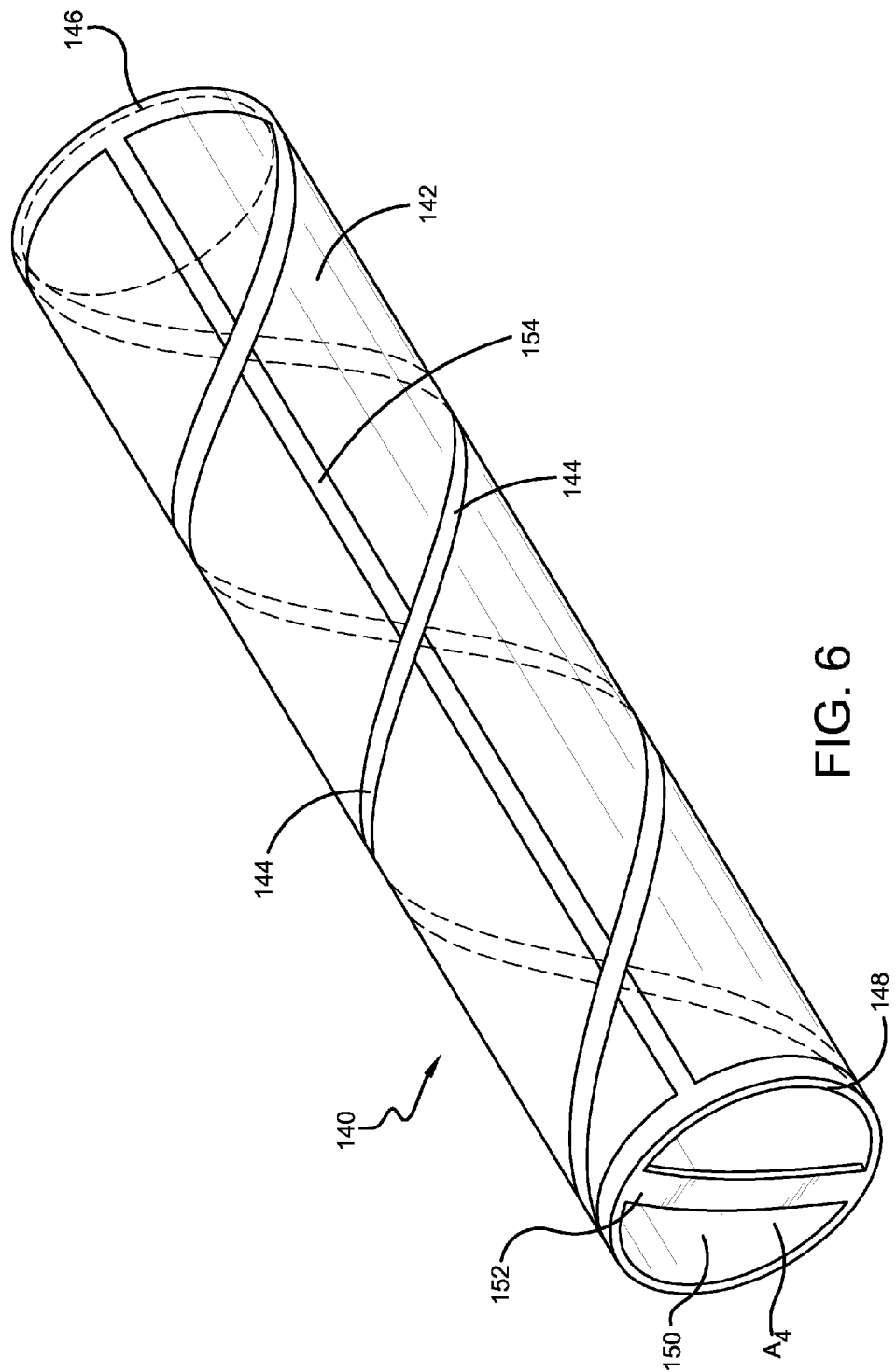
FIG. 6 is a top side perspective view of another alternative insert according to an embodiment of the invention.

FIG. 6 illustrates a top perspective view of container insert 140 that has an elongated bag or tube like shape. Insert 140 includes a cylindrical body 142 that has a maximum circular cross section $A_4$, at least one reinforcement 144, closed first end 146, and a second end 148 having aperture 150 and handle 152 connected to at least two locations of second end 148. Maximum cross sectional area $A_4$ is normal to a longitudinal axis of the insert and is equal to or less than container cross sectional area $A_0$ (discussed above) so the insert can be longitudinally axially positioned inside the container. Insert 140 may be at least partially filled with at least one welding electrode and packaged in a tightly packed container to facilitate an initial removal of electrodes from the container (discussed above). In the illustrated embodiment, insert 140, including cylindrical body 142, at least one reinforcement 144, first end 146, and handle 152, are made from plastic or reinforced paper materials, including the non-exhaustive and non-limiting list of plastic and reinforced paper materials discussed above. At least one reinforcement 144 may connect to first end and/or handle 152 and second end 148 and may longitudinally extend at any angle relative to the longitudinal length of insert 140. In another embodiment, at least one reinforcement may be in a configuration different from what is illustrated in FIG. 6. In the illustrated embodiment, insert 140 may include a fin seal 154 to minimize the cost of making insert 140. In another embodiment, insert can have another cross section, including but not limited to a square or triangular cross section. In yet another embodiment, insert has a maximum cross section that is at a longitudinal position other than either end of the insert.

Figure 7A:
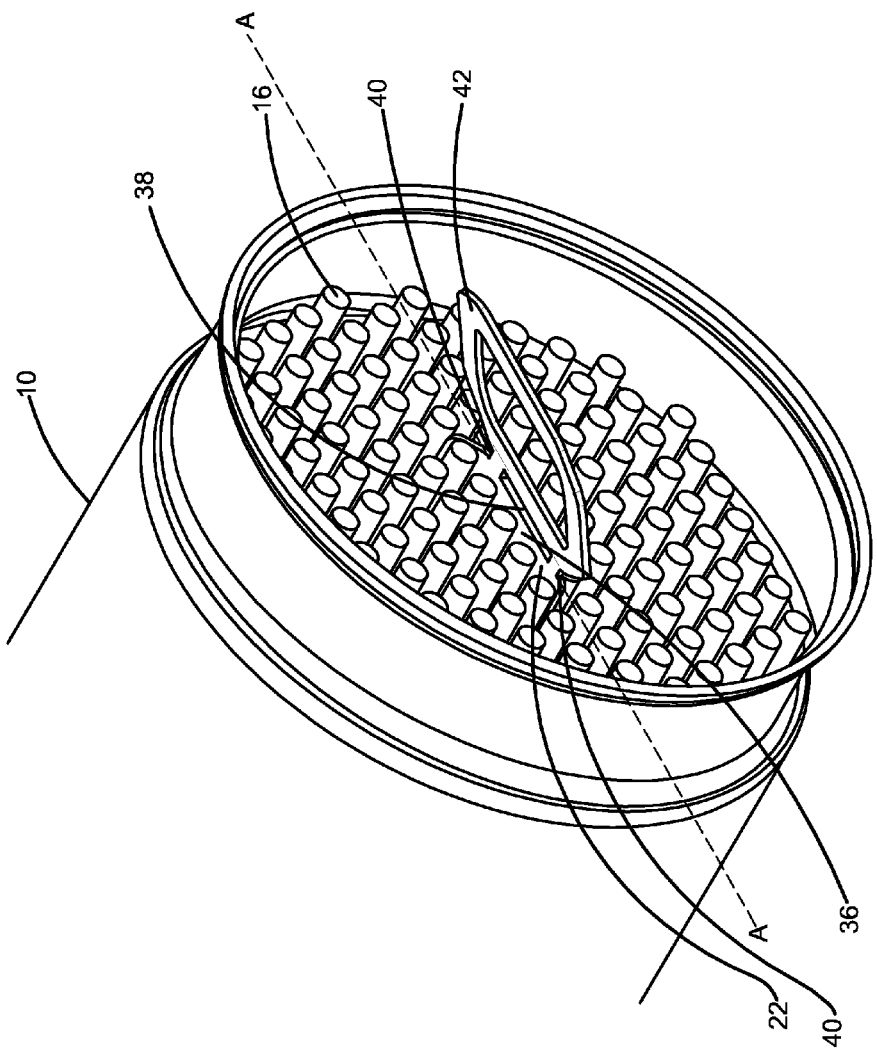
FIG. 7a is a top perspective view of an open container having a tray and electrodes packed in said container according to an embodiment of the invention.
Figure 7B:
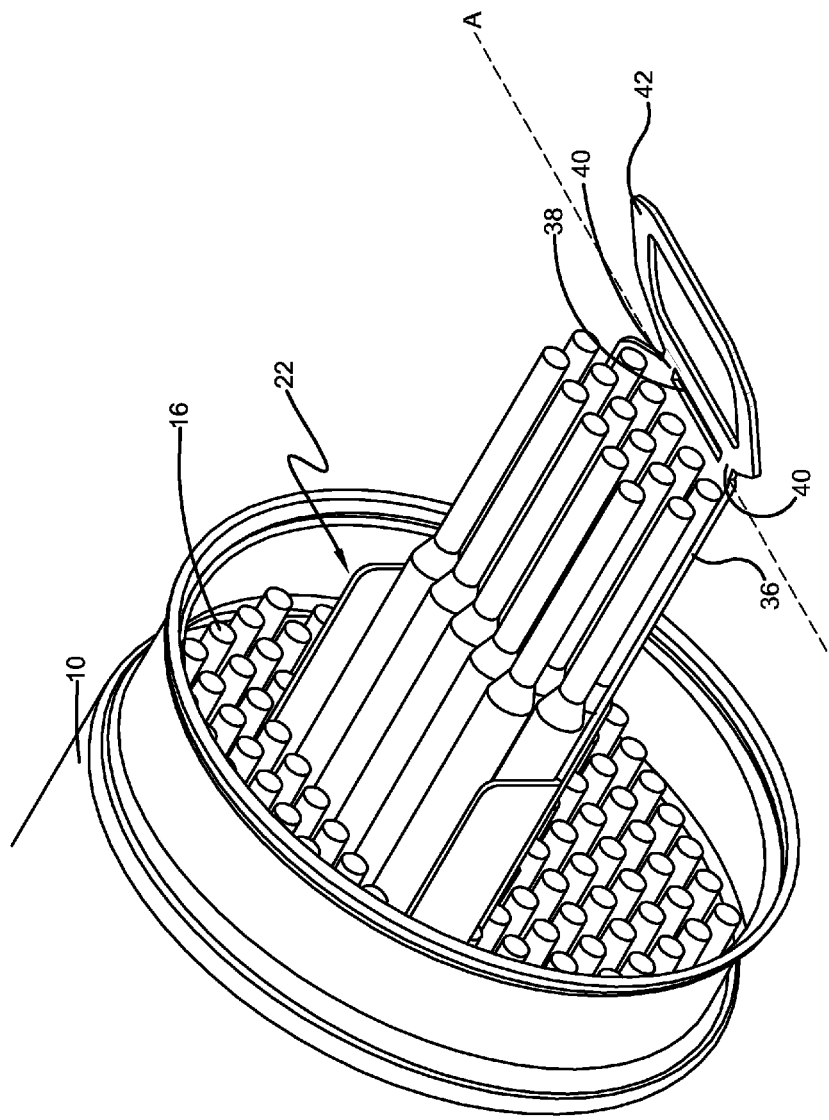
FIG. 7b is a container of FIG. 7a having a tray partially removed according to an embodiment of the invention.

FIGS. 7a-7b illustrate top perspective views of a plurality of tightly packed welding rods 16 packaged with tray-shaped insert 22 (discussed above) to facilitate removal of welding rods 16 from container 10 by hand. FIG. 7a illustrates tray-shaped insert 22 inserted in about the longitudinal center of container 10 and handle 42 longitudinally extending from welding rods 16. In another embodiment, the insert may be inserted in the container at an offset from the longitudinal center. In the illustrated embodiment, handle 42 is in an extended position at about a 25-75 degree angle relative to neck portion 36. In this position, handle 42 will facilitate removal of welding rods 16 from tightly packed container 10 when pulled in a longitudinal direction away from container 10. As discussed above, slot 38 and hinges 40 flexibly connect handle 42 to neck portion 36 so handle 42 can move or bend about axis A between the stored position (shown for example in FIG. 3a) and the extended position illustrated in FIG. 7a. FIG. 7b illustrates container 10 illustrated in FIG. 7a where tray-shaped insert 22 is partially removed from container 10.

From this position, handle 42 may be moved to about a ninety degree angle relative to neck portion 36 to remove individual welding rods 16 by hand or tray-shaped insert 22 can be removed longitudinally further from container 10 to facilitate greater access to rods 16. As discussed above, insert 22 can be used more than once if it is not completely removed from the container by pushing insert 22 back into container 10 which will cause welding rods 16 to refill insert 22.

Figure 8B:
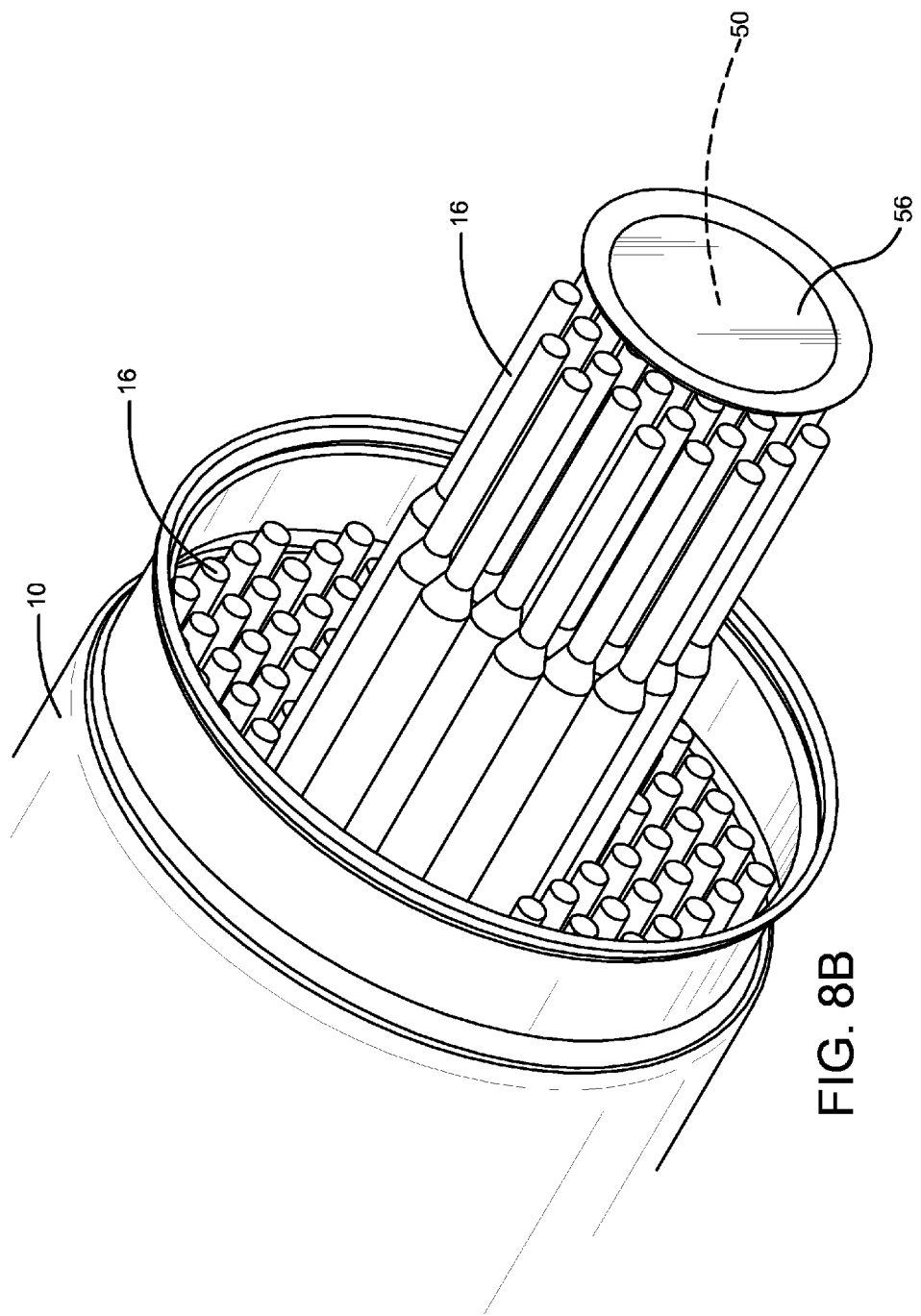
FIG. 8b is the container of FIG. 8a having said insert partially removed according to an embodiment of the invention.

FIGS. 8a-8b illustrate top perspective views of a plurality of tightly packed welding rods 16 packaged with insert 50 (discussed above) to facilitate removal of welding rods 16 by hand. FIG. 8a illustrates insert 50 inserted in about the longitudinal center of container 10 and having handle 56 longitudinally spaced from ends of welding rods 16. Handle 56 may be gripped by hand to facilitate removal of insert 50 and a plurality of welding rods 16 from container 10. FIG. 8b illustrates container 10 illustrated in FIG. 8a where insert 50 is partially removed from container 10. From this position, insert 50 may be longitudinally moved further to facilitate more access to welding rods 16 or may be removed completely from container 10. As discussed above, the insert can be used more than once if it is not completely removed from the container by pushing insert 50 back into container 10 so the insert will refill.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. In combination, a longitudinal tray-shaped insert and a longitudinal container comprising:
    a plurality of welding electrodes packed in said container, said container defining a longitudinal axis and being closed at one end and having an opposed open end;
    said insert defining a longitudinal axis and being longitudinally axially removable from said container and having an end flange affixed to a bottom of said insert at said closed end and said insert hingedly connected to an apertured handle at the opposed open end of said insert, said handle positionable between an extended position extending away in the axial direction from the insert and a closed position, said insert further comprising a pair of opposed side walls fixedly connected to said bottom of said insert, the height of said end flange of said insert being substantially the same as the heights of said side walls,
    a cross-section of said insert being smaller than a cross-section of said container;
    wherein when said insert is positioned within said container, said insert holds at least one of said plurality of welding electrodes positioned therein, said at least one of said plurality of welding electrodes held longitudinally between said closed end and said handle in its closed position;
    wherein said cross-sections are normal to the longitudinal axes of said insert and said container.

2. The combination of claim 1, wherein said insert further comprises a neck longitudinally extending from said hinged tab toward said side walls.

3. The combination of claim 1, wherein said plurality of welding electrodes are tightly packed in said container.

4. In combination, an apparatus comprising:
    an electrode container defining a longitudinal axis and a container cross-sectional area;
    a plurality of welding electrodes packed in said container;
    a longitudinally extending tray-shaped insert having two side walls and an end flange defining a closed end of the insert and an opposing open end, said insert holding at least one welding electrode of said plurality of welding electrodes, wherein when said insert is positioned within said container, said insert holds at least one of said plurality of welding electrodes longitudinally positioned therein between said closed end and said open end;
    wherein said insert is packed in said container, and wherein said insert has a cross-sectional area that is less than said cross-sectional area of said container; and
    an apertured means for removing said insert and said at least one welding electrode from said container, wherein said means is hingedly positioned on said open end of said insert so as to longitudinally hold said at least one welding electrode between said closed end and said means,
    wherein said cross-sectional areas are substantially normal to the longitudinal axes of said container and said insert.

5. The combination of claim 4, wherein said plurality of welding electrodes are tightly packed.

* * * * *